United States Patent [19]

Summers et al.

[11] Patent Number: 5,715,903
[45] Date of Patent: Feb. 10, 1998

[54] MOTORCYCLE HAVING FRONT FORK BRACE FOR REDUCING EXTREME FORK FLEXTURE

[76] Inventors: Scott P. Summers, 5769 Snyder La., Petersburg, Ky. 41080; Thomas W. Summers, 915 Polk St., Carrollton, Ky. 41008

[21] Appl. No.: 581,875

[22] Filed: Jan. 2, 1996

[51] Int. Cl.⁶ .................................................. B62K 25/08
[52] U.S. Cl. ........................... 180/219; 280/279; 403/389
[58] Field of Search ........................... 180/219; 280/274, 280/275, 276, 277, 279, 280; 403/385, 389, 390, 391

[56] References Cited

U.S. PATENT DOCUMENTS

| | | | |
|---|---|---|---|
| 3,643,974 | 2/1972 | Peate | 280/278 |
| 4,479,661 | 10/1984 | Weigl | 280/279 |
| 4,512,592 | 4/1985 | Yoshioka | 280/279 |
| 4,705,285 | 11/1987 | Yoshida | 280/279 |
| 4,742,885 | 5/1988 | Tidwell | 280/279 |
| 4,854,412 | 8/1989 | Tidwell | 180/219 |

*Primary Examiner*—Kevin Hurley
*Attorney, Agent, or Firm*—Wood, Herron & Evans L.L.P.

[57] ABSTRACT

A front fork brace which clamps to the sliding tubular portion of each front fork leg of a motorcycle. The brace captures a resilient member between each sliding tubular fork leg and respective clamping structures of the brace. A cross member rigidly connects the pair of clamping structures between upper ends of the lower sliding tube of each front fork leg. In one embodiment, each clamping structure has upper and lower flanges which capture an enlarged upper portion of the respective sliding tube therebetween to restrain relative movement between the clamping structures and the sliding tube. In another embodiment, the clamping structures clamp onto respective resilient sleeves.

28 Claims, 3 Drawing Sheets

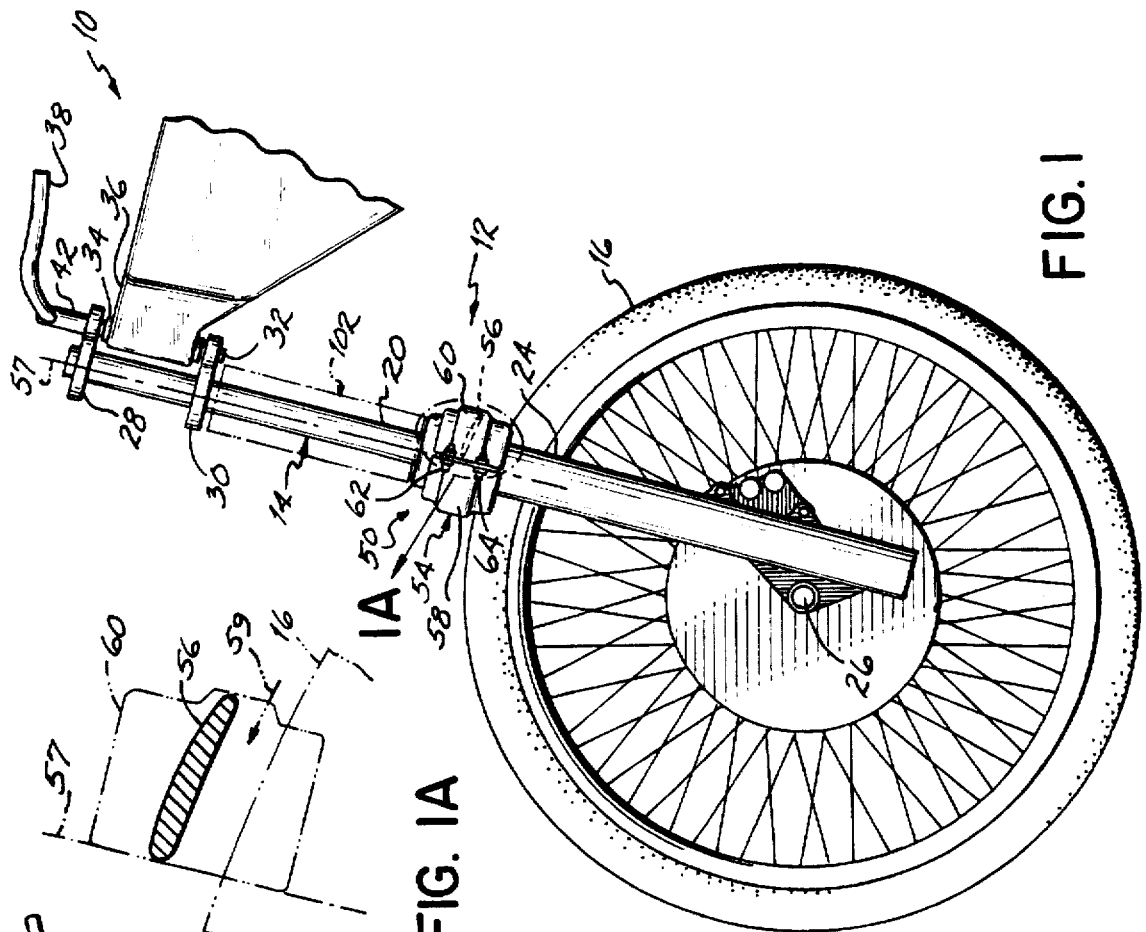
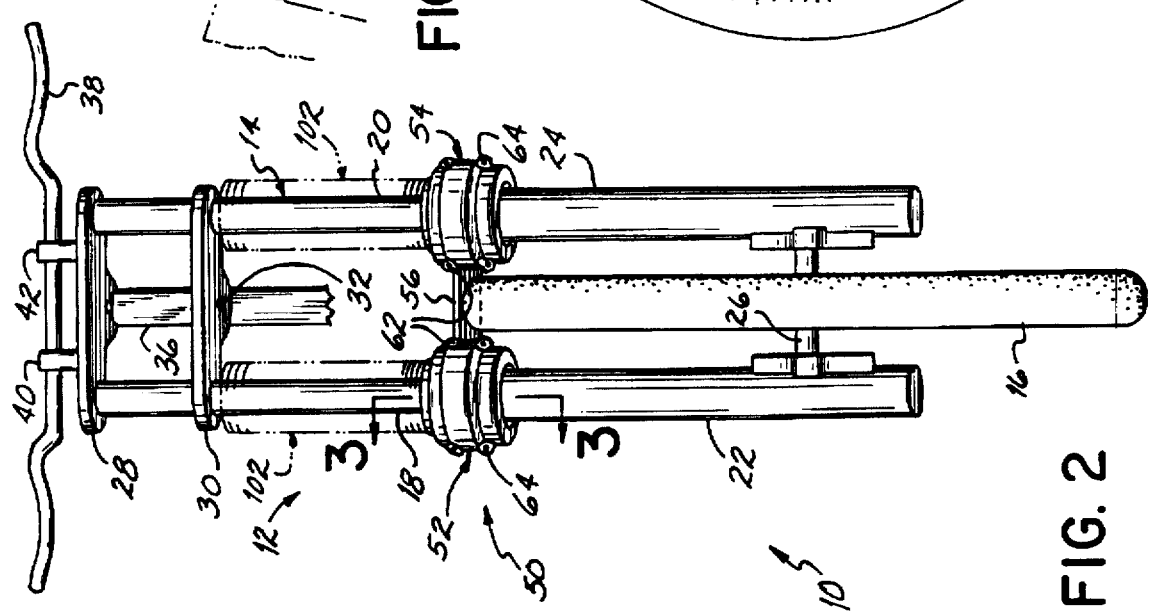

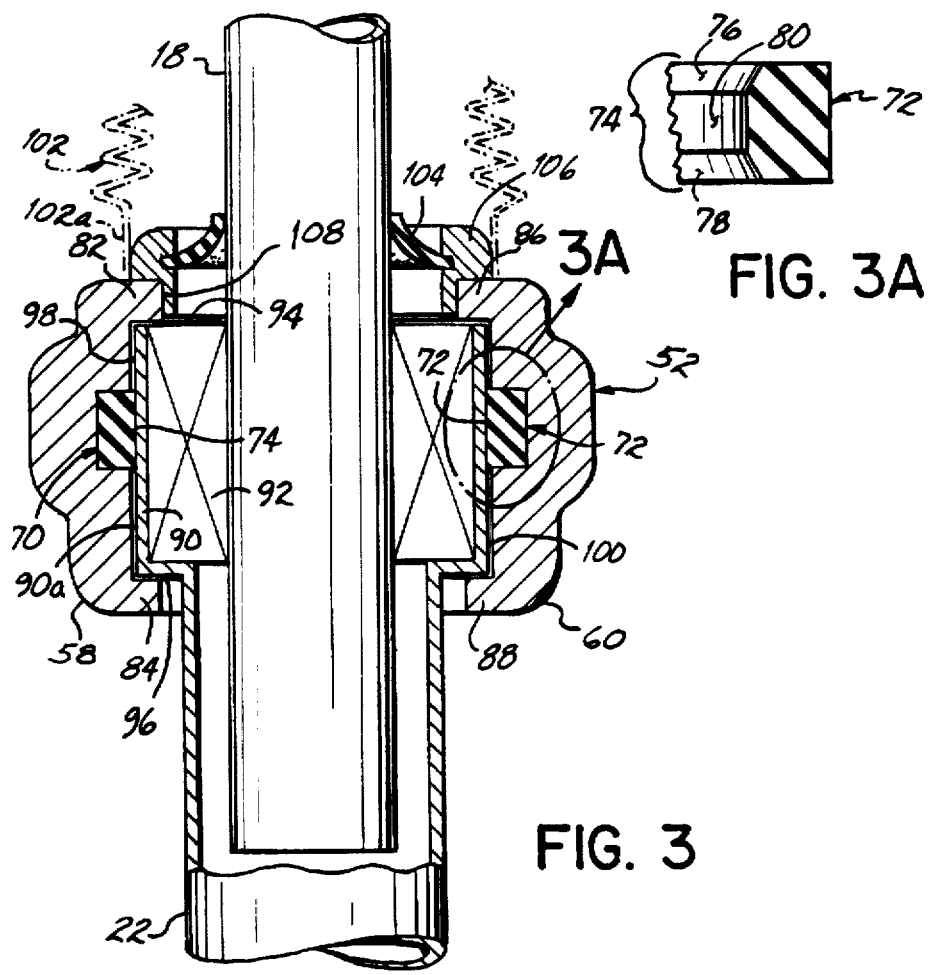
FIG. 3A
FIG. 3
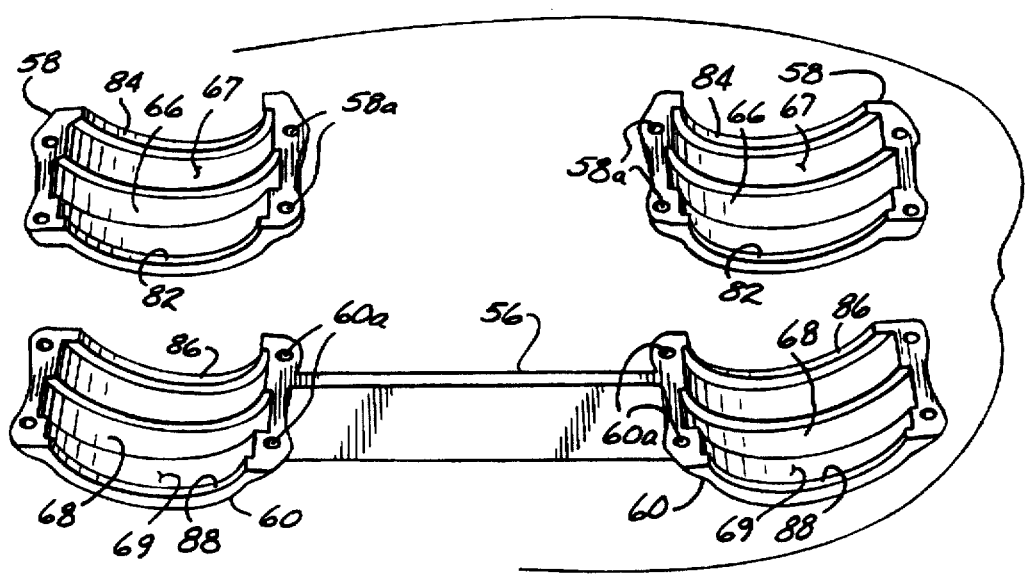
FIG. 4

MOTORCYCLE HAVING FRONT FORK BRACE FOR REDUCING EXTREME FORK FLEXTURE

BACKGROUND OF THE INVENTION

The present invention generally relates to the front suspension of a motorcycle and, more particularly, to a bracing device for the front suspension and fork assembly of a motorcycle.

Conventional telescopic front fork assemblies of motorcycles are comprised of two parallel, telescopic suspension members or forks. Each of these forks is formed by a stationary inner tube which is attached to a steering stem by means of upper and lower clamp assemblies commonly referred to as "triple clamps". The steering stem passes through a sleeve with bearings in the motorcycle frame and handle bars are secured to the upper triple clamp. Steering is accomplished by the rider rotationally displacing the handle bars with respect to the motorcycle frame. A lower, outer slider tube of the fork assembly moves up and down over the inner tube. The axle of the front wheel is attached at the lower ends of the lower outer slider tubes. In most contemporary off-road motorcycles the axle is forward of the centerline of the forks. This arrangement is called a "leading axle" design. There are various pneumatic, hydraulic and mechanical components within each of these two tubes that govern the shock absorption properties of the suspension.

The extreme rigors of off-road motorcycle competition have heightened the awareness of competitors and equipment manufacturers to the problem of fork flexure in telescoping forks and the resulting loss of directional control due to extreme flexure. The function of the suspension system is to absorb as much of the impact with obstacles as possible so that the rider can maintain stability and directional control. In more recent years, greater suspension travel built into the motorcycle by the manufacturer to provide greater obstacle absorption has aggravated this extreme fork flexure problem. This increases the possibility of losing control of the motorcycle in certain off-road conditions. Increased length of newer telescopic fork assemblies is generally believed to be a main contributor to this extreme flexure problem.

Fork flexure can occur as the result of many on and off-road situations but, of course, off-road conditions and situations tend to be more problematic. In some cases the vehicle may resist turning when the rider wants to change directions to steer around an obstacle. Various off-road forms of such resistance include ruts, rocks, tree roots, or simply soft soil conditions. For example, in soft soil conditions, the front tire tends to stay straight while the front forks bend in opposite forward and rearward directions as the rider turns the handlebars. Fork flexure can also occur when the front wheel comes into contact with one of the aforementioned obstacles by tending to redirect the front wheel and change the direction otherwise desired by the rider. When extreme fork flexures occur there is a corresponding loss of suspension performance due to the bent fork legs. Reduced suspension performance along with loss of direction control is an undesirable situation for the rider.

Fork flexure predominantly occurs in the smaller diameter inner tube which, in the case of conventional forks, is the upper stationary component of the front suspension. Recently, some manufacturers began offering telescoping fork assemblies which are oriented oppositely with respect to conventional fork assemblies. That is, the outer telescopic member is mounted in an upper stationary position and the inner tube or piston member is the lower sliding component. This simple reorientation reduced fork flexure in competitive off-road situations, however, this front suspension design has not proven to be as effective in overall shock absorption. Specifically, while these new reversed fork assemblies provide relatively good large bump shock absorption, they do not also provide good small bump shock absorption. For this reason, a competitive rider may have better steering control when using reversed forks but has more small shocks transmitted to the hands and arms. These small shock transmissions can increase rider fatigue.

Certain fork braces and stabilizers have been proposed to lessen or prevent detrimental amounts of fork flexure in motorcycles. Examples are found in U.S. Pat. No. 4,479,661 (the '661 patent); U.S. Pat. No. 4,512,592 (the '592 patent); and U.S. Pat. No. 4,705,285 (the '285 patent). The '661 patent discloses a fork bar for motorcycles basically comprising a pair of end clamps rigidly connected together and connecting the two halves of the fork assembly together. This type of rigid clamp assembly has been found to be too rigid for many situations. Rigid clamping transmits side impacts on the wheel directly into the rider's hands on the handlebar. This is a very undesirable condition for off-road motorcycles particularly when riding in areas with large rocks. The '592 patent also describes a fork reinforcing brace which is rigidly bolted between the lower slider tubes of a conventional fork assembly. This design has resulted in frequent part failure due to the high stress concentration at the bolt sites of the brace. Finally, the '285 patent is essentially a modification of the structure disclosed in the '592 patent. Specifically, the attaching bolts for the brace member pass through resilient bushings which the patent states may be considered as strength adjustment members. While this improved design may have overcome some of the shear resistance or stress concentration problems associated with the prior structure for use in road riding, it still does not provide for adequate strength of the front fork assembly when exposed to the extreme conditions present in off-road use.

Another problem with prior fork brace structures has been that they tend to allow mud and debris to become trapped in the space between the underside of the brace and the tread of the front tire. As the cross members of prior braces are generally horizontally oriented in cross section or otherwise attached between the front forks in a manner which creates a larger space between a forward portion of the cross member and the tire than between a rear portion of the cross member and the tire, a wedging action occurs forcing mud and debris tightly into the narrow wedge-shaped gap between the brace and the tire. This inhibits free rotation of the wheel. None of the prior art braces recognize the width of the gap or the wedge shape as important in preventing undesirable collection of debris. A further failure of the prior art in view of their use in off-road competition is the excessive material thickness and weight required to provide adequate strength. Finally, past braces have led to a more severe reduction in suspension travel, especially during off-road conditions, when the cross member effectively restrains the upward travel prematurely by impacting against mud and debris which collects on the underside of the fender.

It has therefore been one objective of the present invention to provide the front fork assembly of a motorcycle with an optimum amount of flexure by minimizing extreme flexure during adverse conditions but allowing enough flexure to minimize rider fatigue.

It has been still another objective of this invention to prevent mud and debris from wedging or becoming trapped within the space between the front tire and the fork brace.

It has been still another objective of the invention to maintain adequate parallelism of the front fork members with respect to each other to allow free telescopic travel or sliding of each fork member.

Still another objective of the invention has been to prevent dislodgement of the fork brace from the front fork during impacts from obstacles.

Yet another objective of the invention has been to reduce the potential for permanent deformation of a fork member which is struck by a solid obstacle or object,

SUMMARY OF THE INVENTION

To these ends, the present invention generally provides a front fork brace having clamping structures which clamp to each front fork leg and which capture resilient members between each fork leg and the respective clamping structures of the brace. In one preferred embodiment of the invention, a cross member rigidly connects a pair of clamping structures between upper ends of the lower sliding outer tube of each front fork leg. A substantially circumferentially continuous resilient flexure control member is captured and compressed between each clamping structure and the upper end of the respective sliding outer tube. Each clamping structure preferably has upper and lower flanges which capture an enlarged upper portion of the respective stationary tube therebetween to further prevent relative vertical movement between the clamping structures and the sliding outer tube. In this embodiment, the cross member is preferably substantially parallel to the circumference of the wheel or tire when viewed in cross section. This creates an equal or constant spacing between the cross member and the tire at both the front and rear edges of the cross member. The substantially constant spacing helps prevent the undesirable collection and compaction of mud and debris by preventing the wedging of such matter beneath the cross member.

A second embodiment of the invention provides relatively simpler clamping structures secured between the front sliding outer tubes by a cross member. Specifically, clamps capture resilient flexure control members in the form of sleeves between the respective clamps and upper ends of the sliding outer tubes. The sleeves may extend outwardly from upper and lower edges of the clamping structures and provide both flexure control and resistance to dislodgement of the clamping structures. In this second embodiment, the cross member is preferably angled with respect to the outer circumference of the tire such that the rear edge is closer to the tire than the front edge. Rather than the detrimental wedging effect of the prior art, this creates a shearing or slicing of the mud and debris which collects on the tire. That is, as the tire rotates, the mud and debris is continuously sheared off by the rear edge of the cross member and is prevented from detrimentally collecting and wedging between the cross member and the tire.

Thus, the present invention in general contemplates a fork brace having a cross member oriented with respect to the outside circumference of the tire such that spacing between a relative front portion of the cross member and the outside surface of the tire is equal to or greater than the spacing between a relative rear portion of the cross member and the outside surface of the tire. In each embodiment, the cross member is located rearward of the centerline of the forks.

Although applicable to each embodiment, the second embodiment also illustrates a cross member having spaces therein which not only reduce the weight of the brace but also help prevent a reduction in suspension travel. These spaces may be holes or simply recesses in the upper surface of the brace that will allow the mud and debris collected on the underside of the fender to pass or extrude through the cross member at the upper end of the suspension travel thereby preventing a reduction in suspension travel.

The generally angular orientation of the cross member in each embodiment increases its resistance to bending along the front fork axis, i.e., along the axis about which forces are generally directed during street riding and especially off-road riding. Also, particularly with regard to after market applications of the present invention, the location of the cross member behind the front fork axis maximizes the gap between the brace, tire and fender.

Additional advantages and objectives of the invention will become more readily apparent to those of ordinary skill upon review of the following detailed description of the preferred embodiments taken in conjunction with the accompanying drawings.

BRIEF DESCRIPTION OF THE DRAWINGS

FIG. 1 is a side elevational view schematically illustrating the front suspension of a motorcycle which includes a fork brace constructed in accordance with a first embodiment of the invention;

FIG. 1A is a diagrammatic cross sectional view shown as encircled area 1-A of FIG. 1 showing the relationship between the cross member, the integral clamp element, the wheel or tire and the centerlines or axes of the front forks;

FIG. 2 is a front elevational view of the fork brace and front suspension shown in FIG. 1;

FIG. 3 is a cross-sectional view of one fork brace clamp and front fork shown in FIGS. 1 and 2 and taken along line 3—3 of FIG. 2;

FIG. 3A is a cross-sectional view of the resilient flexure control member before it is clamped in place as shown in FIG. 3;

FIG. 4 is a disassembled perspective view of the front fork brace and clamp shown in FIGS. 1-3 without the resilient flexure control member;

DETAILED DESCRIPTION OF THE PREFERRED EMBODIMENTS

Figure 5:
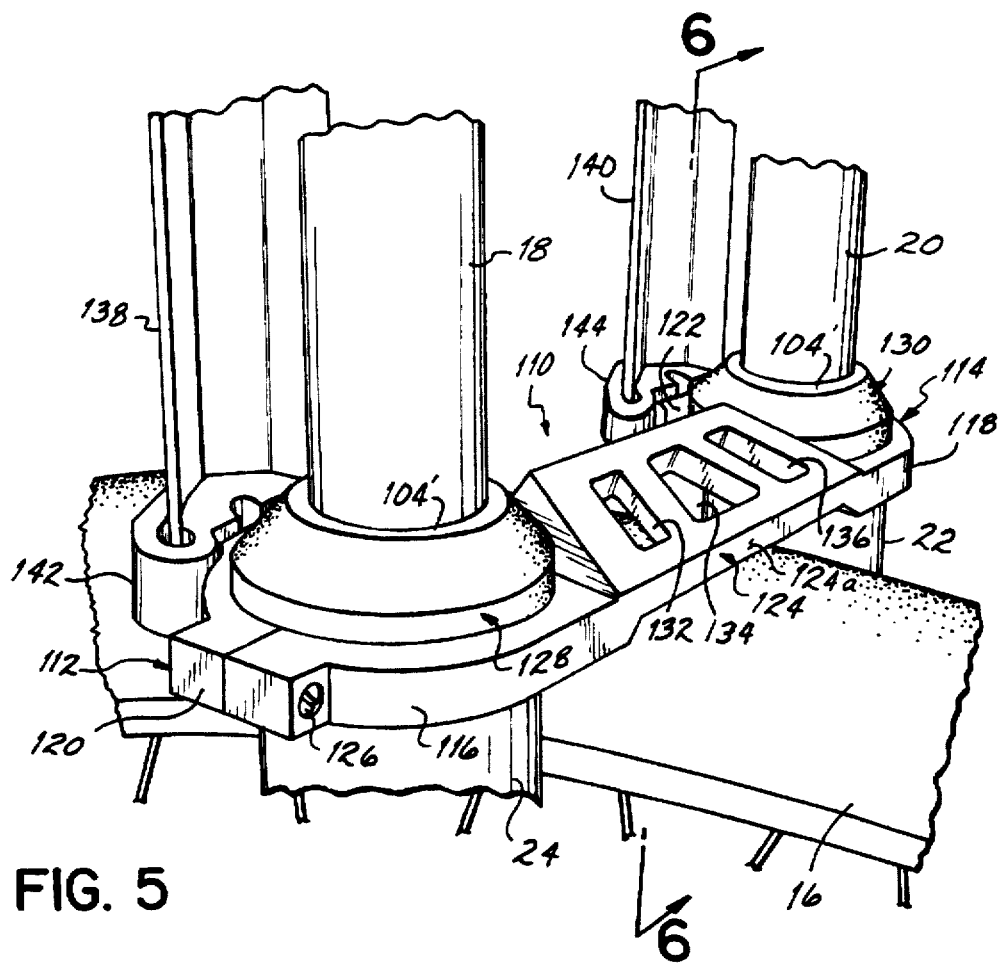
FIG. 5 is a perspective view of a front fork brace constructed in accordance with a second embodiment of the invention.

Referring generally to FIGS. 1 and 2, a motorcycle 10 is diagrammatically shown with portions thereof deleted except for the front end 12 which incorporates the principles of the present invention. Specifically, a telescopic fork suspension 14 supports the front wheel 16 in generally a conventional manner. That is, a pair of upper telescopic members 18, 20 and a pair of lower telescopic members 22, 24 are connected for relative telescopic movement. Preferably, members 18, 20, 22, 24 are tubular. Contained within the telescopic fork suspension 14 are conventional sleeve bearings, oil, oil seals, compression springs, pistons, piston rings, cylinders, flow orifices, etc., which are not shown as they do not form any part of the present invention. Those of ordinary skill will readily appreciate these standard components as being necessary to support the front end 12 of motorcycle 10 in a shock absorbing manner. The resistance to sliding or friction between inner tubes 18, 20 and lower outer tubes 22, 24 is referred to as "stiction" in the art. Parallelism between upper inner tubes 18, 20 and lower tubes 22, 24 is critical to maintain a low amount of stiction.

Leading axle 26 of front wheel 16 is rigidly connected to lower tubes 22, 24 and is provided with various spacers and bearings (not shown) which provide centering of wheel 16 and rotational freedom of wheel 16 about axle 26. Upper tubes 18, 20 are rigidly secured to a pair of upper and lower triple clamp assemblies 28, 30 and a steering stem 32 also passes centrally through upper and lower triple clamp assemblies 28, 30 at a location rearward of upper and lower tubes 18, 20 as shown in FIG. 1. Steering stem 32 also passes through a sleeve 34 fixed to motorcycle frame 36. Sleeve 34 contains appropriate bearings (not shown) to allow free rotation of front end 12 about the center line of steering stem 32. A handle bar 38 is rigidly connected to the upper triple clamp assembly 28 by a pair of clamps 40, 42.

In accordance with one preferred embodiment of the present invention, and still referring to FIGS. 1 and 2, a fork brace 50 is provided for securing lower tubes 22, 24 to one another in a manner which allows enough flex for preventing rider fatigue, but which secures lower tubes 22, 24 to each other rigidly enough to maintain low stiction even when front end 12 and, specifically, wheel 16 encounters large obstacles which can produce sideward or steering restraining forces, such as during off-road conditions. As shown best in FIG. 2, fork brace 50 includes a pair of clamping structures 52, 54 which are secured to upper ends of the respective lower sliding tubes 22, 24 in a manner more specifically discussed below.

Clamping structures 52, 54 are secured to one another in a rigid fashion by a cross member 56. Except for certain components to be discussed below, the clamping structures 52, 54 and cross member 56 are preferably formed of a rigid material which may be a metal such as steel or aluminum. Aluminum may be especially desirable for competitive motorcycles in which overall vehicle weight is critical. In this first preferred embodiment cross member 56 is substantially parallel to the circumference of the front wheel 16 and may be slightly curved as shown in FIG. 1A. Cross member 56 may instead be a flat or uncurved member which is oriented substantially tangent to the outside circumference of the wheel 16. As the tire or wheel circumference is relatively great and the width of cross member 56 is relatively small, detrimental wedging of mud and debris will still be prevented in this instance. In each case, mud and debris will more easily pass through the gap between cross member 56 and tire or wheel 16 as the wheel rotates in the direction of arrow 59.

Referring to FIG. 1A, for leading axle conventional forks as shown in FIG. 1, the cross member 56 is located rearward of each fork centerline or axis 57. Only one of these axes 57 is shown in FIG. 1A, but it will be understood that these axes 57 are parallel to one another and contained in the same plane as viewed in FIG. 1. It will also be understood that each clamp 52, 54 defines a clamping axis which is coincident with the respective fork axis 57 and about which the respective clamps 52, 54 are secured. This rearward location allows a maximum gap between the wheel 16 and the cross member 56 without interfering with the suspension travel. This maximized gap further reduces the potential for debris, particularly mud, to collect between the cross member 56 and the wheel 16 in a manner which hinders free wheel rotation.

Referring now specifically to FIG. 4, each clamping structure 52, 54 comprises a pair of clamp members 58, 60.

Holes 58a, 60a are provided perpendicular to fork axis 57 and holes 60a may be threaded for receiving screw fasteners 62, 64 (FIG. 1) which secure the separated clamp members 58 to clamp members 60 which are formed integrally with cross member 56. Fasteners 62, 64 are predominantly stressed in tension during fork flexure situations. This stress is reduced by the resilient members 70, 72 (FIG. 3). Grooves 66, 68 are provided within the curved inner surfaces 67, 69 of clamp members 58, 60. As shown in FIG. 4, these grooves 66, 68 are generally parallel to the upper and lower edges of clamp members 58, 60 and follow the half ring shaped curvature of clamp members 58, 60.

FIG. 3 shows a cross-sectional view of the installed fork brace 50 on one telescopic fork leg comprised of upper tube 18 and lower tube 22. It will be understood that the other fork leg comprised of upper tube 20 and lower tube 24 is identical in cross-section. As shown in FIG. 3, a pair of elastomeric or resilient strip members 70, 72 are respectively disposed within grooves 66, 68 and held in compression. Resilient strips 70, 72 substantially encase lower fork legs 22, 24 and are made of two pieces only to ease assembly of the fork brace.

FIG. 3A illustrates the normal shape of each resilient strip member 70, 72 when not placed in compression by clamp members 58, 60. Specifically, an inner surface 74 projects inwardly and converges toward a central area of strip 72. Strip 70 is shaped preferably in the same manner. In the preferred embodiment, surface 74 specifically consists of upper and lower tapered surfaces 76, 78 converging toward a central flat surface 80.

As also illustrated in FIG. 3, each clamp member 58, 60 includes respective upper and lower inwardly projecting flanges 82, 84 and 86, 88 which extend inwardly of and partially envelope an upper enlarged portion 90 of lower tube 24. Upper enlarged portion 90 of lower tube 24 may contain, for example, a bearing and/or seal structure 92 as is conventional. Specifically, flange portions 82, 84 and 86, 88 extend inwardly over upper and lower surfaces 94, 96 of enlarged portion 90. Resilient strips 70, 72 are sized such that when clamp members 58, 60 are secured to one another by screw fasteners 62, 64 (FIG. 1) the gap 98, 100 formed between the respective clamp members 58, 60 and the outer surface 90a of enlarged portion 90 is maintained.

FIG. 3 also illustrates a boot cover 102 designed to keep debris from contacting upper tube 20. Boot cover 102 may have its lower end 102a connected to the upper flange portions 82, 86 or otherwise to the upper surfaces of clamp members 58, 60 by way of a mud scraper or wiper assembly 104, 106. Specifically, a support ring 106 may be press fit into the upper circular hole 108 of clamp members 58, 60 when fastened together as shown in FIGS. 1 and 2. Mud scraper or wiper 104 bears against the outside cylindrical surface of upper tube 20 to keep out debris, dust or other particulates from lower tube 24 and the various seals, bearings and components contained therein.

FIG. 5 illustrates an alternative fork brace 110 constructed in accordance with the principles of this invention. This embodiment, like the first embodiment, generally includes a pair of clamping structures 112, 114. Clamping structures 112, 114 are likewise formed of respective clamp members 116, 118 and 120, 122. Clamp members 116, 118 are integrally formed at opposite ends of a cross member 124. Clamp member 120 is fastened to clamp member 116 and clamp member 122 is fastened to clamp member 118 by respective pairs of screw fasteners 126, only one of which is shown in FIG. 5. Resilient, elastomeric sleeves 128, 130 are disposed between clamping structures 112, 114 and the respective upper ends of lower tubes 22, 24. Sleeves 128, 130 are placed into compression about their central portions as shown in FIG. 5 when clamping structures 112, 114 are tightened down. In each embodiment, the preferred material for the flexure control member is neoprene rubber, although other resilient materials such as natural or synthetic rubbers or other elastomeric materials are contemplated to be within the scope of the invention. In the preferred embodiments the hardness of the rubber is 60–65 Shore A durometer and is compressed to approximately 75% of its original thickness by the clamping structure. This central compression of each sleeve 128, 130 aids in preventing the dislodgement of clamping structures 112, 114 when, for example, they are struck by an object such as during off-road racing. Like the first embodiment, a wiper or mud scraper assembly 104' is preferably disposed at the upper end of lower tube 22, 24 for preventing loose matter on the outside of upper tubes 18, 20 from reaching the interior or tubes 22, 24. The wiper or mud scraper 104' can be an integral part of resilient sleeves 128, 130 as shown or may be separate.

As further shown in FIG. 5, cross member 124 includes a plurality of holes 132, 134, 136. In an alternative, these holes 132, 134, 136 may instead simply be upper recesses in cross member 124. The purpose of holes 132, 134, 136 is both to reduce the weight of brace 110 and also to allow for the fullest suspension travel of wheel 16 in an upward direction when mud or other debris has collected on the underside of the motorcycle fender (not shown). Instead of being impacted against the upper surface of cross member 124, such mud and debris will pass into and extrude through holes 132, 134, 136. Of course, other designs, shapes and numbers of holes or spaces may be provided in cross member 124. A pair of conventional guards 138, 140 are provided for protecting upper tubes 18, 20 from becoming damaged by stones or other objects. These guards 138, 140 are fastened at their upper ends to the lower triple clamp (not shown) and are held for sliding movement in a pair of guides 142, 144 which are also conventional except that they are secured to clamp members 120, 122 instead of lower tubes 22, 24 as is the usual case.

Figure 6:
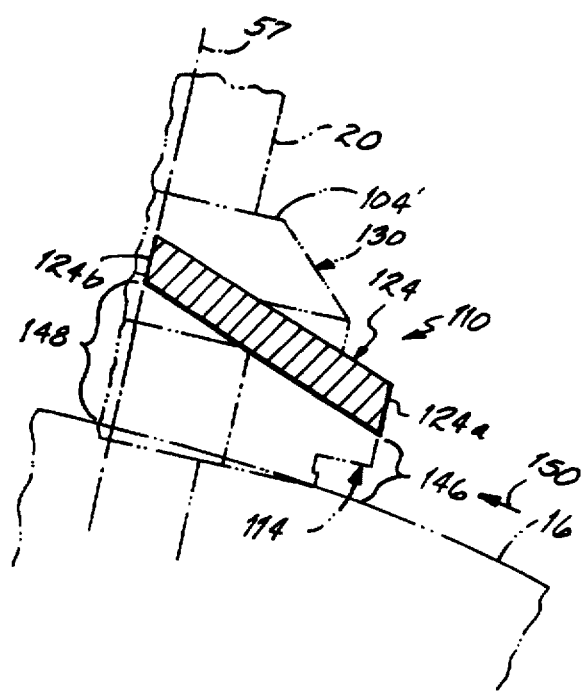
FIG. 6 is a cross sectional view taken along line 6—6 of FIG. 5 and showing analogous relationships to those of FIG. 1A.

As further shown in FIG. 6, the angled design of cross member 124 creates a smaller gap or spacing 146 at a rear portion 124a of cross member 124 than the gap or spacing 148 at a front portion 124b of cross member 124. Thus, as tire or wheel 16 rotates in the direction of arrow 150, mud and other debris will be sheared off at lower edge 124a and will not collect beneath cross member 124 with the detrimental wedging effect experienced with past brace structures. It will further be understood that the clamping axis of each clamp 112, 114 is substantially coincident with the respective fork axis 57 and that cross member 124 is located rearward of this axis 57 as in the first embodiment.

While only two specific embodiments of the present invention have been shown and described above, the various aspects of each may be incorporated into the other and those of skill in the art will readily recognize many modifications and substitutions of various components and therefore Applicant does not intend to be bound by the details provided but only by the scope of the claims appended hereto.

What is claimed is:

1. A front fork brace for a motorcycle, said fork brace comprising:

first and second clamping structures for securing to respective fork legs of the motorcycle;

a cross member having a front edge, a rear edge and two ends respectively connected to said first and second clamping structures; and at least one resilient member received by each of said first and second clamping structures and sized for placement and securement between said first and second clamping structures and the respective fork legs of said motorcycle.

2. The front fork brace of claim 1 wherein said first and second clamping structures are curved members having recesses on respective inner sides thereof for receiving said resilient members.

3. The front fork brace of claim 2 wherein said first and second clamping structures each include upper and lower inwardly directed flanges.

4. The front fork brace of claim 1 wherein said first and second clamping structures each include upper and lower inwardly directed flanges.

5. The front fork brace of claim 1 wherein said cross member is integrally formed with a first clamp member of each clamping structure and each clamping structure further includes a second clamp member formed separately from said first clamp member and fixed to said first clamp member by at least one fastener.

6. The front fork brace of claim 1 wherein said resilient members are sized to be fully contained between upper and lower edges of said clamping structures.

7. The front fork brace of claim 1 wherein said resilient members are formed as sleeves which are sized to extend outwardly from upper and lower sides of said clamping structures.

8. The front fork brace of claim 1 wherein said first and second clamping structures include a wiper member secured thereto for engaging a telescoping front fork leg of the motorcycle.

9. The front fork brace of claim 1 wherein said clamping structures define a clamping axis about which said clamping structures may be secured and wherein said cross member is a generally flat member angled from said front edge to said rear edge in a nonperpendicular relationship relative to said clamping axis.

10. The front fork brace of claim 9 wherein said cross member is curved from said front edge to said rear edge.

11. The front fork brace of claim 9 wherein said cross member is located rearward of said clamping axis.

12. The front fork brace of claim 1 wherein said clamping structures define a clamping axis about which said clamping structures may be secured and wherein said cross member is located rearward of said clamping axis.

13. The front fork brace of claim 1 wherein said cross member includes spaces in at least an upper side thereof.

14. The front fork brace of claim 13 wherein said spaces are holes formed in said cross member.

15. A motorcycle having a frame and a front fork suspension comprising:

a pair of fork members securing a wheel therebetween for generally upward and downward movement relative to said frame;

first and second clamping structures secured to the respective fork members;

a cross member having a front edge, a rear edge and two ends respectively connected to said first and second clamping structures; and at least one resilient member received by each of said first and second clamping structures and secured between said first and second clamping structures and the respective fork legs of said motorcycle.

16. The motorcycle of claim 15 wherein said first and second clamping structures are curved members having recesses on respective inner sides thereof for receiving said resilient members.

17. The motorcycle of claim 16 wherein each fork member includes a lower tube secured to an axle of said wheel and each of said first and second clamping structures includes upper and lower inwardly directed flanges which capture an enlarged portion of the respective lower tube therebetween.

18. The motorcycle of claim 15 wherein each fork member includes a lower tube secured to an axle of said wheel and each of said first and second clamping structures includes upper and lower inwardly directed flanges which capture an enlarged upper portion of the respective lower tube therebetween.

19. The motorcycle of claim 15 wherein said cross member is integrally formed with a first clamp member of each clamping structure and each clamping structure further includes a second clamp member formed separately from said first clamp member and fixed to said first clamp member by at least one fastener.

20. The motorcycle of claim 15 wherein said resilient members are sized to be fully contained between upper and lower edges of said clamping structures.

21. The motorcycle of claim 15 wherein said resilient members are formed as sleeves which are sized to extend outwardly from upper and lower sides of said clamping structures.

22. The motorcycle of claim 15 wherein said first and second clamping structures include a wiper member secured thereto for engaging a telescoping front fork leg of the motorcycle.

23. The motorcycle of claim 15 wherein said fork members are disposed along parallel axes and said cross member is a generally flat member angled from said front edge to said rear edge in a nonperpendicular relationship relative to said axes.

24. The front fork brace of claim 23 wherein said cross member is curved from said front edge to said rear edge.

25. The motorcycle of claim 23 wherein said cross member is located rearward of said axes.

26. The motorcycle of claim 15 wherein said fork members are disposed along parallel axes and wherein said cross member is located rearward of said axes.

27. The motorcycle of claim 15 wherein said cross member includes spaces in at least an upper side thereof.

28. The motorcycle of claim 27 wherein said spaces are holes formed in said cross member.

* * * * *